United States Patent [19]
Groom

[11] 3,957,255
[45] May 18, 1976

[54] EXTRUSION MACHINE

[76] Inventor: George Berfert Groom, Woodlands, Wragby, Lincoln, England

[22] Filed: Dec. 6, 1973

[21] Appl. No.: 422,342

[30] Foreign Application Priority Data
Dec. 7, 1972 United Kingdom............ 56540/72

[52] U.S. Cl............................ 259/185; 259/DIG. 30
[51] Int. Cl.² ............................................. B29B 1/06
[58] Field of Search................. 259/9, 10, DIG. 30, 259/185, 191, 192, 7, 8, 6, 21–26, 41–46; 425/200, 201, 202

[56] References Cited
UNITED STATES PATENTS

| | | | |
|---|---|---|---|
| 1,192,492 | 7/1916 | Blichfeldt | 259/DIG. 30 |
| 1,988,743 | 1/1935 | Kenzie | 259/9 |
| 2,015,056 | 9/1935 | Barnes | 259/9 |
| 2,612,354 | 9/1952 | Dron | 259/DIG. 30 |
| 2,705,131 | 3/1955 | Ross | 259/DIG. 30 |
| 3,682,447 | 8/1972 | Zucker | 259/9 |
| 3,845,938 | 11/1974 | Schold | 259/DIG. 30 |

*Primary Examiner*—Robert W. Jenkins
*Attorney, Agent, or Firm*—Cushman, Darby & Cushman

[57] ABSTRACT

A machine for processing thermoplastic materials and in particular for extruding thermoplastic materials having a casing including two generally opposing surfaces of which the temperature is controlled and which at least in part define an enclosed working chamber, an inlet for introducing material into the working chamber and an outlet for leading processed material away from the working chamber, a rotor mounted for rotation within the casing and having a plurality of blades disposed between the said surfaces of the working chamber with adjacent blades separated by an open space defined by the adjacent blades and portions of the two surfaces of the working chamber, each blade including generally oppositely directed first and second surfaces with the first blade surface closely confronting one of the surfaces of the working chamber to form a first region of shear and with the second blade surface closely confronting the other surface of the working chamber to form a second region of shear, the blades being so shaped to transport material from the inlet to the outlet during rotation of the blades between the generally opposed surfaces of the working chamber and serving, in use, to produce multiple shearing action and mixing action and improved heat transfer in the material contained in the spaces during transport action and processing thereof from the inlet to the outlet.

10 Claims, 6 Drawing Figures

EXTRUSION MACHINE

The invention relates to a machine for processing thermoplastic materials. A machine in accordance with this invention is particularly suitable for use as an extrusion machine.

An object of the invention is to provide a simplified and improved form of machine which is cheaper to manufacture than the known machines but which, in addition, brings considerable technical advantages. Another object of the invention is to extend the range of application to new and improved extrusion techniques.

According to one aspect of this invention there is provided a machine for processing thermoplastic material comprising a casing including two generally opposing surfaces which at least in part define an enclosed working chamber, means for heating and controlling the temperature of the two surfaces of the working chamber, an inlet for introducing material into the working chamber and an outlet for leading processed material away from the working chamber, a rotor mounted for rotation within the casing and having a plurality of blades disposed between the said surfaces of the working chamber with adjacent blades separated by an open space defined by the adjacent blades and portions of the two surfaces of the working chamber, each blade including generally oppositely directed first and second surfaces with the first blade surface closely confronting one of said surfaces of the working chamber to form a first region of shear and with the second blade surface closely confronting the other said surface of the working chamber to form a second region of shear, the blades being so shaped to transport material from the inlet to the outlet during rotation of the blades between the generally opposed surfaces of the working chamber and serving, in use, to produce multiple shearing action and mixing action and improved heat transfer in the material contained in the spaces during transport action and processing thereof from the inlet to the outlet.

According to another aspect of this invention there is provided a machine for processing thermoplastic material comprising a casing including two generally opposing surfaces which at least in part define an enclosed working chamber, means for heating and controlling the temperature of the two surfaces of the working chamber, an inlet for introducing material into the working chamber and an outlet for leading processed material away from the working chamber, a rotor mounted for rotation within the casing and having a plurality of blades disposed between the said surfaces of the working chamber with adjacent blades separated by an open space defined by thrust faces of adjacent blades and portions of the two surfaces of the working chamber, each blade including generally oppositely directed first and second surfaces with the first blade surface closely confronting one of said surfaces of the working chamber to form a first region of shear and with the second blade surface closely confronting the other said surface of the working chamber to form a second region of shear, the blades being so shaped to transport material from the inlet to the outlet by the angle of the blades and the forces arising from the difference between the surface area of the thrust faces of the blades and the relatively larger area of the generally opposed surfaces of the working chamber and serving, in use, to produce multiple shearing action and mixing action and improved heat transfer in the material contained in the spaces during transport action and processing thereof from the inlet to the outlet.

The blades of the rotor may extend in a plane perpendicular to the axis of rotation, in which case material is transported in a generally radial direction. Alternatively, the blades may extend co-axially with the axis of rotation in which case material is transported in a generally axial direction.

If desired, the rotor may be so designed as to transport material in a direction intermediate the said axial or radial direction or in any combination thereof.

In one form of machine having a rotor which extends co-axially with the axis of rotation, the rotor is generally of a hollow cylindrical form and is mounted for rotation within an outer cylinder or barrel attached to an inner cylinder or barrel within the cylindrical rotor; the inner surface of the outer cylinder and the outer surface of the inner cylinder being in closely spaced relation with the rotor.

The heating and/or cooling means and temperature control means referred to previously may be mounted upon either or both of the said cylinders or barrels. The inlet comprises an aperture through either one of the cylinders or barrels, preferably the outer cylinder or barrel, for the introduction of materials for processing into the vanes of the rotor.

The outlet or series of outlets is conveniently located at an end of the rotor opposite to the inlet aperture. Materials passing from the outlet are forced into suitable head and die assemblies.

Similarly, machines in which the rotor extends perpendicularly to the axis of rotation comprise two metal plates forming parts of the casing and between which the rotor is rotatable. Means for heating and/or cooling and temperature controlling means for the casings or elsewhere are provided. In one form of machine an aperture is provided toward the centre of the rotor, through which material is introduced into the enclosed space and the outlet or series of outlets, through which the material is forced into suitable head and die assemblies, is located at an outer periphery of the rotor.

. If required, and according to the construction of the machine, the barrels or the metal plates may be integral with a supporting assembly, or as an integral part of an extruding head and die assembly.

Preferably, the blades are curved so that the free ends thereof lag, with respect to the direction of rotation, the ends remote from the free ends where the blades are attached to the body of the rotor.

Considerable importance is attached to the design of the rotor to ensure that materials introduced into the spaces between the blades of the rotor, either in solid particulate, liquid or combined forms, are propelled along between the metal enclosing surfaces by the action caused by the rotation of the rotor, and that the materials so enclosed receive such heat, pressure, mixing and multiple shearing action that may be required.

In the case where the rotor extends in a plane perpendicular to the axis of rotation the blades are equally spaced around and extend outwardly from a central bush and a peripheral portion of the blades, adjacent the outlet or series of outlets, is swept back with respect to the direction of rotation.

When the rotor extends co-axially with the axis of rotation the blades may be helically curved, in the manner of a helical screw thread, to form the hollow generally cylindrical rotor.

One advantage of the extrusion machine or pump according to this invention is the simplification or elimination of the thrust forces normally set up in conventional extrusion machines by the action of archimedean screw within the barrel and the area of the screw subject to back pressure from the material being forced along the barrel and through the head. These forces are transmitted to the main supporting assembly by thrust races, and the transmission of these forces becomes increasingly complex with multi-screwed machines, and with large diameter machines.

In machines where the rotor extends perpendicularly to the axis of rotation the forces arising from material movement and mixing are balanced in all directions and a neutral condition is established. This effectively removes design limitations on the diameter and size of unit and can eliminate the need for thrust race assemblies.

Similarly, in machines in which the rotor is of hollow cylindrical form and extends co-axially with the axis of rotation, the area of the rotor subject to thrust forces will, by virtue of the rotor operating between an inner and outer barrel, be comparatively small thereby simplifying the design problems, and removing practical manufacturing limits upon the diameter and size of machines which can be manufactured.

Another advantage of extrusion machines according to this invention is the considerable simplification of the flow problems existing in the present and known designs of extrusion heads used for the manufacture of large diameter plastic tubes. These are costly to produce, extremely heavy and cumbersome, and have long internal flow paths for the material being processed. On the other hand, machines of the present invention have a shorter flow path for the material and a more positive and controlled movement. This will effectively reduce the quantity of material within the head structure, and simplify problems of differential flow and the heat degradation of material.

A further advantage is the improved transfer of heat to materials within the rotor blades by its enclosure between two heated casings or barrels. Additionally, the materials so enclosed will receive a dual shearing and mixing action from the action of the rotor between the casing or barrel faces. This better heat transfer, improved shear and circulation of material will effectively reduce both the time and distance required in known machine designs for the heating and homogenisation of a given product.

Extruding machines according to this invention are particularly suitable and can be used to advantage for the mixing and compounding of plastics and other materials.

Additionally, the machines are suitable for the extrusion of tubes of all types and sizes, for the extrusion of films, sheets and sections of all types.

Considerable reduction in costs is envisaged as compared with conventional extruding machines or pumps, arising from the lower capital and operating costs and additionally from an increase in operating efficiency during the manufacturing processes, specifically the manufacture of large diameter plastic tubes and a saving of scrap normally produced.

The invention also includes a method of processing thermoplastic material comprising the steps of introducing the material into an enclosed working chamber defined at least in part by two generally opposed surfaces and having an inlet and an outlet for admission and discharge of the material; heating and controlling the temperature of the material in the working chamber; transporting the material through the working chamber by rotating a rotor mounted for rotation between the said two surfaces, the rotor having a plurality of elongate blades which closely confront the said two surfaces, rotation of the rotor causing a multiple shearing action of the material between the blades and the confronting surfaces and between adjacent blades thereby creating a mixing action in the material and assisting in transfer of heat within material during transportation and processing thereof from the inlet to the outlet.

Embodiments of the invention will now be described by way of example with reference to the accompanying drawings, of which:

Figure 1:
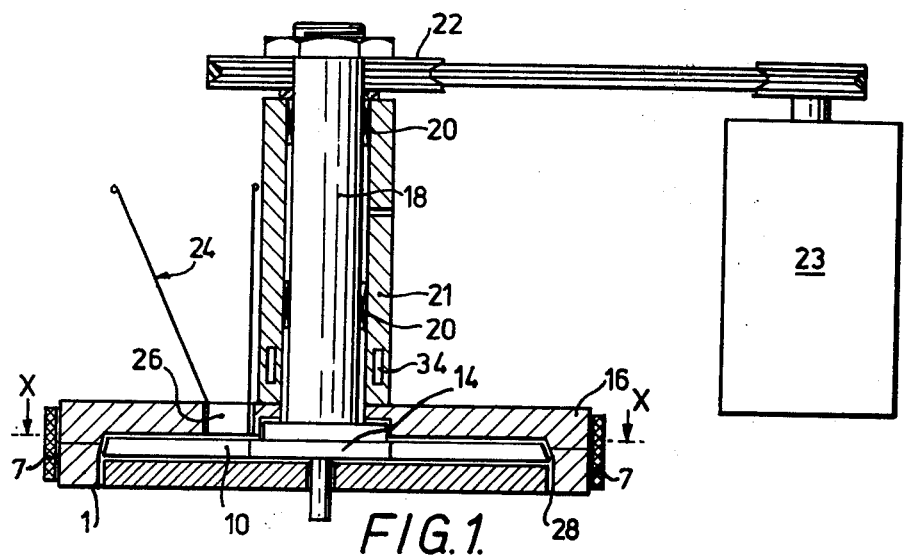
FIG. 1 is a schematic cross-sectional elevation of a first extrusion machine in which the rotor extends in a direction perpendicular to the axis of rotation of the rotor.
Figure 2:
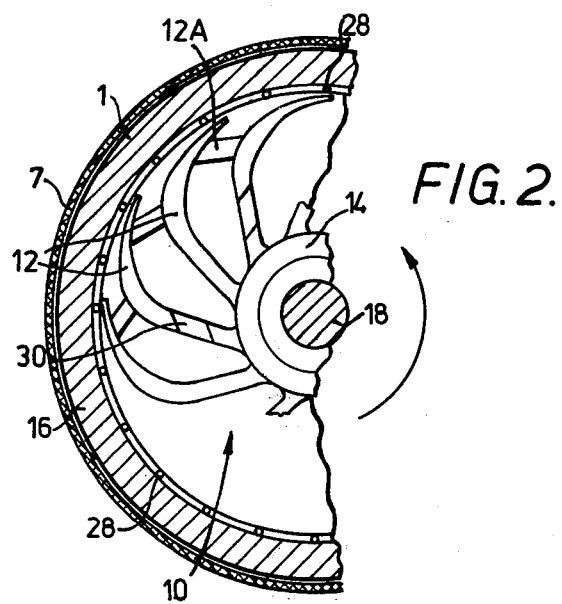
FIG. 2 is a schematic cross-section on XX of FIG. 1.

In FIGS. 1 and 2 a rotor 10 having a plurality of blades 12, extending in a plane perpendicular to the axis of rotation of the rotor and equally spaced around a central rotor body 14, is shown enclosed within an outer casing 16. The working clearance between the opposed walls of the casing and the outer edges of the blades is from 0.002 to 0.004 inches depending on the requirements of the machine. A shaft 18 upon which the rotor 10 is mounted is supported by bearings 20 in a housing 21 to which the outer casing 16 is attached and is driven, via a pulley 22 also mounted on the shaft, by an electric motor 23.

Material (not shown) to be extruded is introduced into the enclosed working chamber from a hopper 24 communicating with an aperture 26 in the casing 16 adjacent a radially inner portion of the rotor blades and is conveyed by the rotor to a series of circular outlets 28 to an extrusion head or die assembly, adjacent peripheral edge portion of the rotor blades 12, which are supported by spacers 12A. Archimedean screws (not shown) can be used to convey material into the inlet and/or from the outlets.

The rotor blades 12 are swept back (with respect to the direction of rotation of the rotor 10 indicated by the arrow in FIG. 2) and are shaped or angled to ensure conveyance of material to be extruded from the inlet aperture 26 to the series of outlets 28. If required, escape channels 30 may be formed in the rotor vanes or blades 12 to increase the clearance between portions of the vanes or blades and the internal surface of the casing thereby permitting material to flow between those portions of the blades and the internal surface of the casing 16 to improve mixing of the material. The material to be extruded is heated during mixing and pumping by heaters 7 arranged around the periphery of the casing 16.

Coolant is circulated through channels 34 formed in the housing 21 to reduce the amount of heat which would otherwise be conducted along the housing 21 to the bearings 20.

Figure 3:
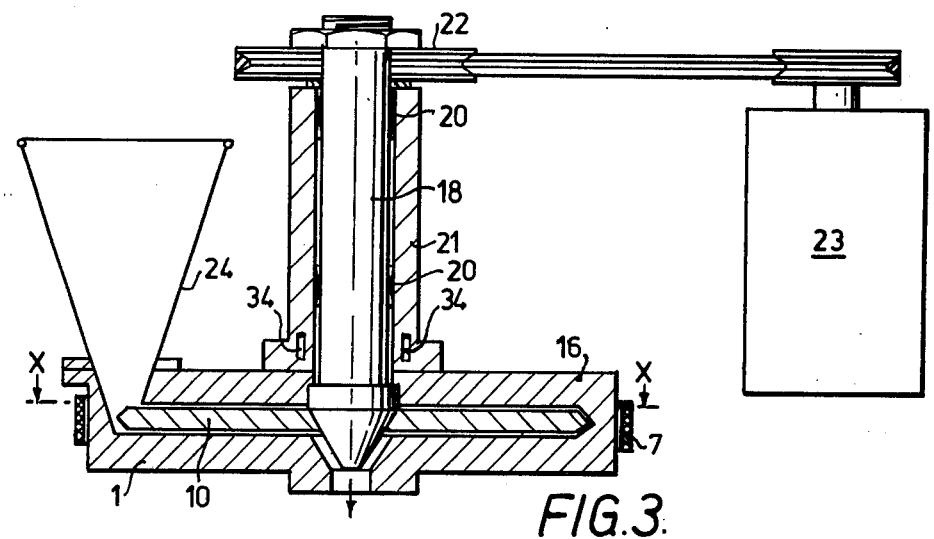
FIGS. 3 and 4 are schematic cross-sections similar to FIGS. 1 and 2, of a modified machine.
Figure 4:
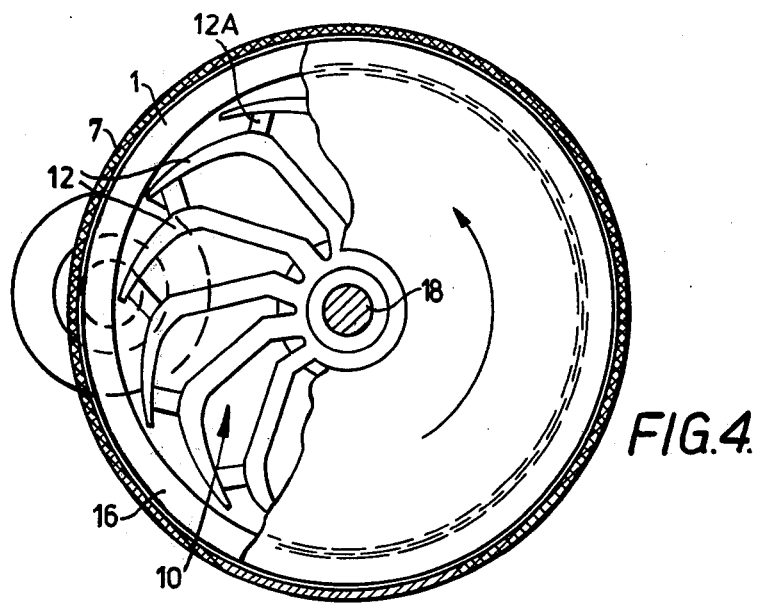

FIGS. 3 and 4 show a machine similar to the machine of FIGS. 1 and 2 and having the same reference numbers designating similar parts. The difference between the machines of FIGS. 1 and 2 and FIGS. 3 and 4 is that in the former, the inlet hopper 24 is disposed to feed material into the inner region of the working chamber whereas, in the latter, the inlet hopper is located in the region of the periphery of the working chamber. Similarly, in FIGS. 1 and 2 the outlet is in the form of a series of perpherally disposed apertures 28 whereas in FIGS. 3 and 4 a single central outlet 28 is employed.

Figure 5:
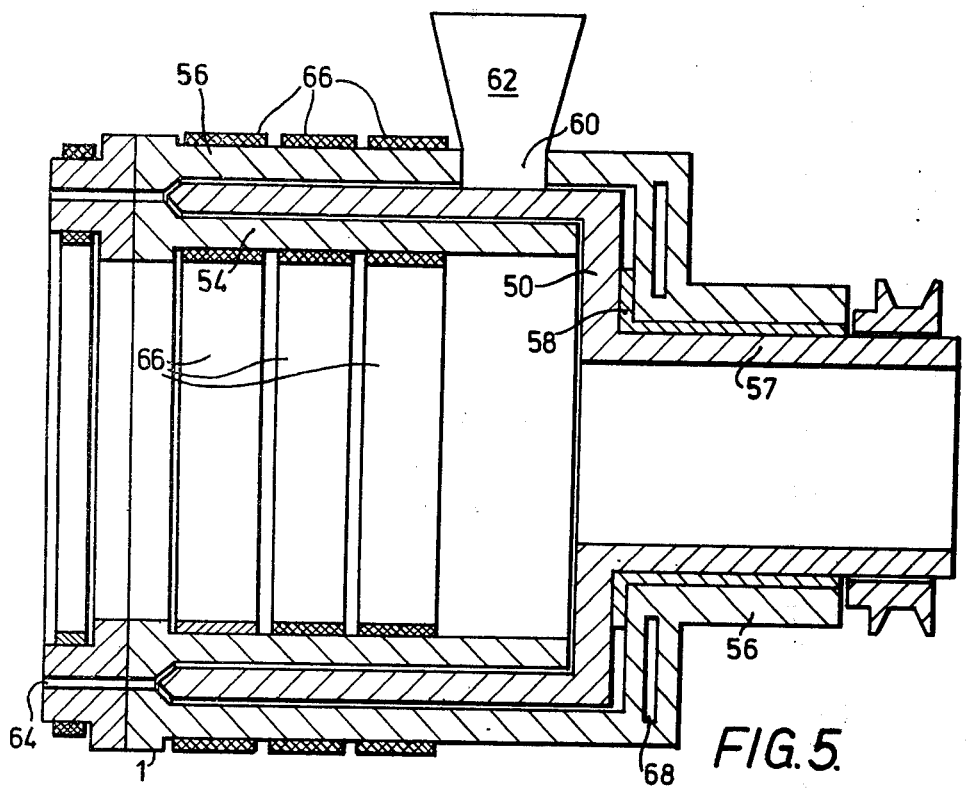
FIG. 5 is a schematic cross-sectional elevation of a third extrusion machine in which the rotor extends co-axially with the axis of rotation of the rotor.
Figure 6:
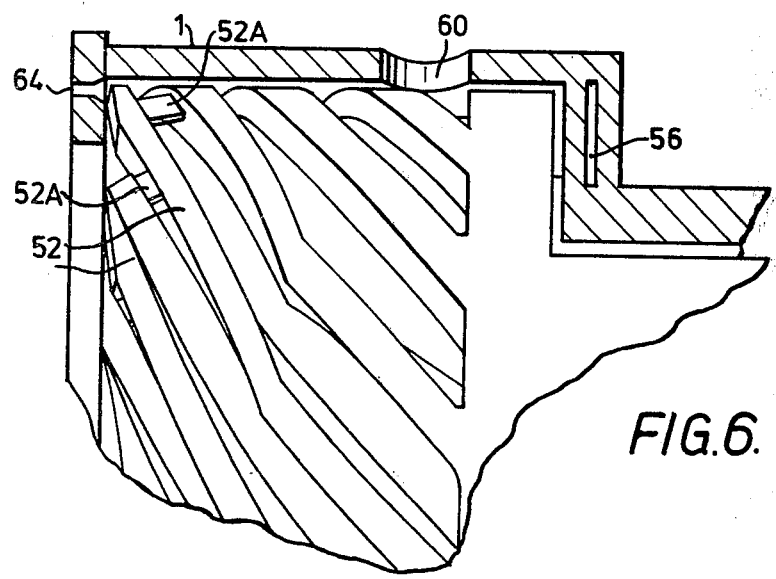
FIG. 6 is a cross-section of the extrusion machine of FIG. 5 but showing the form of the rotor.

FIGS. 5 and 6 show a different type of extrusion machine in which a rotor 50 having a plurality of blades 52 which extend co-axially with the axis of rotation of the rotor, is mounted for rotation between an inner 54 and an outer 56 barrel. A drive shaft 57 for the rotor 50 is supported in the outer ballel 56 by combined thrust and journal bearing 58. In this case the rotor blades or vanes 52 are helical in form and transport material to be extruded from an inlet 60, into which material is introduced from a hopper 62 and adjacent that portion of the rotor where the vanes or blades are attached to a rotor body, to outlets 64 adjacent the free end of the rotor blades.

The barrels 54 and 56 are heated by heaters 66 and the bearing 58 is cooled by the circulation of a coolant through channel 68 in the manner described above with reference to FIGS. 1 and 2.

Clearance of about 0.002 to 0.004 inches between the inner surface of the outer barrel and the outer surface of the inner barrel and the rotor blades is also provided in this type of extrusion machine, and escape channels (not shown) may be provided in the blades or vanes if desired to ensure adequate mixing of the material to be extruded.

In each of the above described embodiments the blades may be connected together at the free ends by bridges 52A to prevent undue deflection.

In a series of trials with models constructed basically as described, performance of the machine was evaluated using a series of powder mixes of polyvinyl chloride, plasticisers, stabilisers, lubricants and pigment prepared in a high speed mixer. Operating at a rotor speed of 36 rpm and a temperature on the enclosing casings of 150° – 200°C the powder was converted to an homogeneous compound stage and conveyed effectively to the die exits to emerge in multiple strands.

In a further series of experiments with p.v.c. mixes as described but containing no plasticiser the material was effectively homogenised and conveyed to the die exits.

Further trials with a wide range of thermoplastics such as polythene, polypropylene and polystyrene were conducted to evaluate the conveyance and mixing of pigments into the material.

A machine or pump according to the present invention may be used in conjunction with conventional screw extrusion machines or pumps to extend the range of those machines.

What we claim is:

1. A machine for processing thermoplastic material comprising a casing including two generally opposing surfaces which at least in part define an enclosed working chamber, means for heating and controlling the temperature of the two surfaces of the working chamber, a gravity fed hopper for introducing said material through an inlet into the working chamber and an outlet for leading processed material away from the working chamber, a rotor mounted for rotation within the casing and having a root and a plurality of blades extending outward form said root and disposed between the said surfaces of the working chamber with adjacent blades separated by an open space defined by thrust faces of adjacent blades and portions of the two surfaces of the working chamber, each blade extending from the region of the inlet to the region of the outlet and each blade including generally oppositely directed first and second surfaces with the first blade surface closely confronting one of said surfaces of the working chamber to form a first region of shear and with the second blade surface closely confronting the other said surface of the working chamber to form a second region of shear, the blades being so shaped to transport material from the inlet to the outlet by the angle of the blades and the forces arising from the difference between the surface area of the thrust faces of the blades and the relatively larger area of the generally opposed surfaces of the working chamber and serving, in use, to produce multiple shearing action and mixing action and improved heat transfer in the material contained in the spaces during transport action and processing thereof from the inlet to the outlet.

2. A machine according to claim 1, wherein the blades are disposed in a plane perpendicular to the axis of rotation of the rotor.

3. A machine according to claim 1 wherein the blades are so shaped and angled to transport material radially outwardly from the inlet to the outlet.

4. A machine according to claim 1 wherein the blades are so shaped and angled to transport material radially inwardly from the inlet to the outlet.

5. A machine according to claim 1 wherein the rotor is of hollow cylindrical form and the blades are shaped to transport material axially from the inlet to the outlet.

6. A machine according to claim 5, wherein the blades are helical.

7. A machine according to claim 5, wherein the said two opposing surfaces define a working chamber of constant annular cross-section throughout the axial length thereof.

8. A machine according to claim 1 in which the rotor is so shaped as to transport material from the inlet to the outlet in a direction intermediate an axial direction and a direction perpendicular to the axis of rotation of the rotor or any combination of said directions.

9. An assembly of two or more machines as claimed in claim 1, wherein the outlet of one machine is directly connected to the inlet of another machine.

10. A machine as in claim 1, wherein the separation between each of said surface and said blades is between 0.002 and 0.004 inches.

* * * * *